United States Patent [19]

Haines et al.

[11] Patent Number: 4,484,055
[45] Date of Patent: Nov. 20, 1984

[54] SPOT WELDER

[76] Inventors: Maurice S. Haines, 53 Middleton Close, Tysoe, Warwickshire; Victor A. Keller, 32-33 Cattle Market St., Norwich, Norfolk, both of England

[21] Appl. No.: 517,645

[22] Filed: Jul. 27, 1983

Related U.S. Application Data

[62] Division of Ser. No. 309,052, Oct. 6, 1981.

[30] Foreign Application Priority Data

Oct. 7, 1980 [GB] United Kingdom ............... 8032230

[51] Int. Cl.$^3$ .............................................. B23K 9/28
[52] U.S. Cl. ............................ 219/86.21; 219/86.25; 219/75; 219/124.01
[58] Field of Search .................... 219/80, 86.21, 86.25, 219/124.01, 127, 98, 99, 136, 70, 86.1

[56] References Cited

U.S. PATENT DOCUMENTS

| | | | |
|---|---|---|---|
| 2,683,791 | 7/1954 | Ruehlemann et al. | 219/127 X |
| 3,030,544 | 4/1962 | Zamboldi et al. | 219/70 X |
| 3,183,338 | 5/1965 | Forney | 219/75 |
| 4,201,904 | 5/1980 | Weidman | 219/99 X |

FOREIGN PATENT DOCUMENTS 637146 5/1950 United Kingdom .

Primary Examiner—C. L. Albritton
Assistant Examiner—Catherine M. Sigda
Attorney, Agent, or Firm—Banner, Birch, McKie & Beckett

[57] ABSTRACT

A welder comprises a tubular support, a collar in the tubular support and a copper-coated carbon rod in the collar which extends coaxially therein. The collar is connected through a slot in the wall of the support to an exterior operating member, said operating member being operable so as to move the rod axially of the tubular support to a position adjacent a workpiece to enable an electric arc to be formed between the rod and the workpiece. A plurality of prongs is provided at one end of said tubular support, said prongs having free ends arranged to engage the workpiece at spaced apart positions adjacent the area where the arc is to be struck. Resilient means is provided to produce a bias which acts against the movement of the rod towards the workpiece.

10 Claims, 2 Drawing Figures

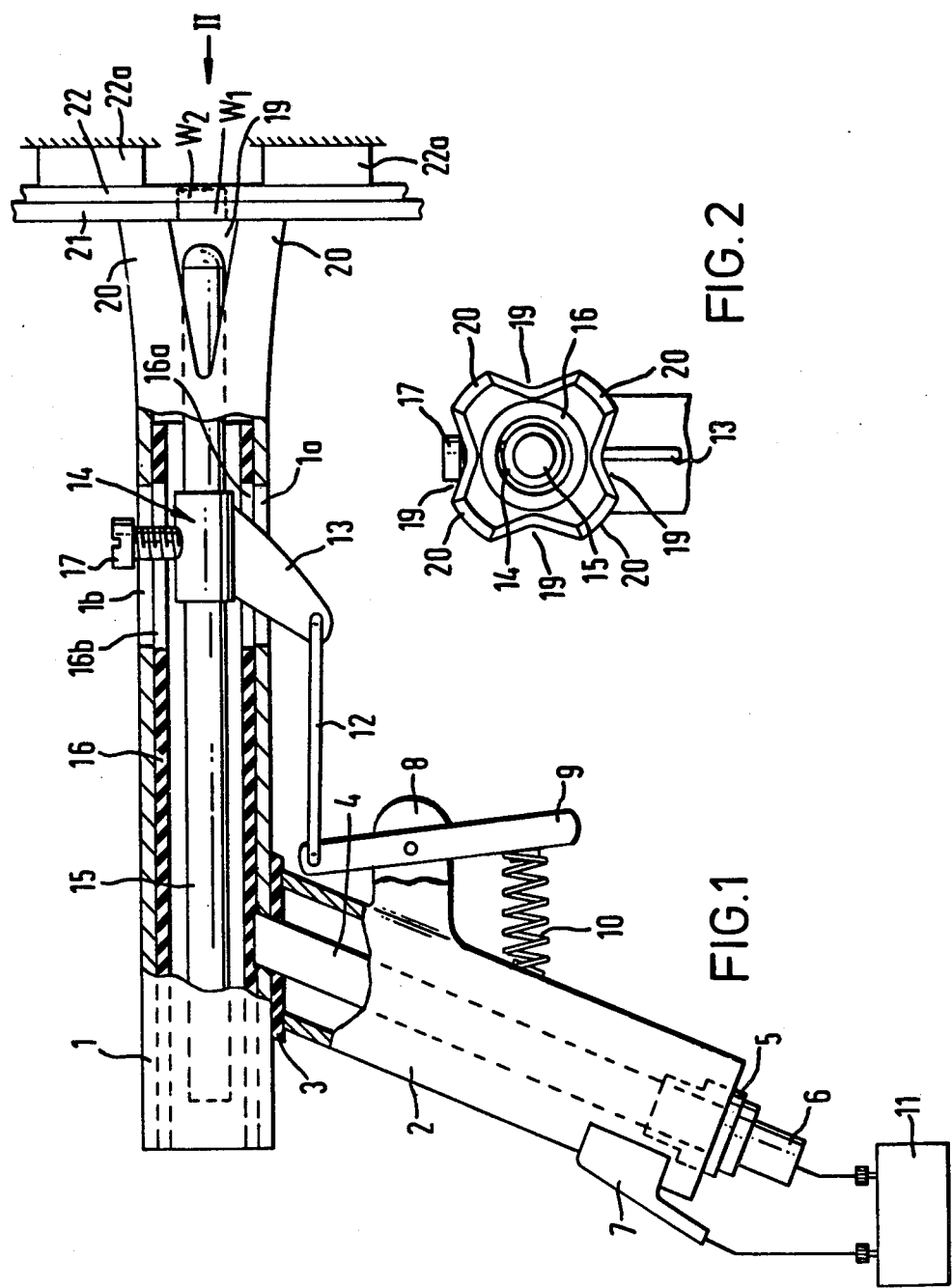

SPOT WELDER

This application is a division, of application Ser. No. 309,052, filed Oct. 6, 1981.

The invention relates to a welder.

BACKGROUND

There are various types of welders on the market nowadays for use by the home handyman. In the main, such welders are of the electric arc type and are often sold in kits comprising a welder and a welding transformer for use, for example, in the repair of motor vehicle bodywork. Whilst such kits undoubtedly provide useful welding tools, the usual electric arc welder is far too fierce for modern day motor panels and the home mechanic is unlikely to weld together body panels successfully with such a welder. Such disadvantages could be overcome by using a spot welder but the normal type of spot welder requires access to the rear of the workpieces to be joined and this is sometimes not possible. Moreover, spot welding apparatus is very expensive and usually cumbersome.

SUMMARY OF THE INVENTION

An object of the present invention is to provide a welder which overcomes the foregoing disadvantages. Therefore, according to one aspect of the invention there is provided a welder comprising support means for an electrically conductive element, a holder for said element on the support means and which is movable relative to said support means for moving the element to aposition adjacent a workpiece to enable an electric arc to be formed between the element and the workpiece, and means on the support means incuding a plurality of elongate workpiece engaging members extending longitudinally of the support means. The free ends of the elongate members engage the for engaging the workpiece at spaced apart positions adjacent the region in which the arc is to be struck, and define between them elongate observation areas through which the arc and the forming weld can be viewed.

Such an arrangement is particularly advantageous for welding together two contiguous sheet metal workpieces arranged one behind the other. The element is normally moved initially against the front workpiece and is then withdrawn slightly to strike the arc. The arc is maintained for sufficient length of time (as determined manually be viewing the molten pool of metal through the observation areas) to melt the metal of the two workpieces in a region adjacent the arc and the arc is then extinguished by withdrawing the element further. Such action will produce an effective spot weld between the two workpieces. The workpiece engaging members apply pressure to the workpieces so that the two workpieces are pressed firmly together during the welding operation.

The workpiece engaging members or prongs means carried by the support means for engaging the workpiece may be arranged to engage the workpiece at two or four positions around the region in which the arc is struck. Such an arrangement is particularly advantageous as it enables pressure to be applied substantially evenly around or on each side of the area to be welded to ensure firm contact between the workpieces.

Preferably the support means is tubular and the element is movable axially of the tube, the workpiece engaging members being arranged at one end of the tube.

The element may comprise a rod, a copper coated carbon rod being preferred, which may be mounted in a collar in the tubular support means, the rod extending generally coaxially of the tubular support means and the collar being connected by means extending through the wall of the tubular support means to an operating member outside thereof.

According to another aspect of the invention there is provided a welder comprising a tubular support, a collar in the tubular support, a copper-coated carbon rod in the collar and extending generally coaxially of the tubular support, and an operating member outside the (including a handle mounted trigger) which is rigidly connected to the collar, through the wall of the tubular member said operating member being operable so as to move the rod axially of the tubular support to a position adjacent a workpiece to enable an electric arc to be formed between the rod and the workpiece. A plurality of prongs is fitted on one end of said tubular support, said prongs having free ends arranged to engage the workpiece at spaced apart positions adjacent the area where the arc is to be struck. A coil springs inside the tubular support provides a bias which acts against the axial movement of the rod .

BRIEF DESCRIPTION OF THE DRAWINGS

Welders in accordance with the invention will now be described by way of example with reference to the accompanying drawings in which:

FIG. 1 is an elevation of a welder in accordance with the invention in the form of a gun and shown partly in cross-section and FIG. 2 is an end view of the barrel of the gun shown in FIG. 1 looking in the direction of arrrow II in FIG. 1.

DETAILED DESCRIPTION

Referring to FIGS. 1 and 2, the gun comprises a metal barrel 1 (constituting the aforesaid support means) connected to a tubular metal handle 2 with an insulating layer 3 therebetween to ensure that the barrel and handle are electrically insulated from each other. A metal rod 4 is welded to the barrel 1 and extends through the interior of the handle 2. At its lower end, the rod 4 passes through an insulating sleeve 5 in the bottom of the handle and has a suitable connector 6 thereon to enable it to be connected to a terminal of a normal twin terminal welding transformer unit 11. The handle 2 has a connector 7 thereon so that it can be connected to the other terminal of the transformer 11. A suitable battery may be used instead of a transformer.

A bracket 8 is welded to the handle 2 and pivotally supports a metal trigger 9. The trigger is biassed anti-clockwise about the pivot by means of a compression spring 10 extending between the trigger and the handle. The upper end of the trigger is pivotally connected by means of a wire 12 to a leg 13 of a collar 14. The leg 13 projects through a slot 1a in the barrel 1 and the collar receives a copper coated carbon rod 15 (constituting the aforesaid electrically conductive element). The rod 15 extends through an insulating liner 16 in the barrel which is formed with a slot 16a through which the leg 13 passes. The rod 15 is gripped by a screw 17 on the collar. The screw extends through a slot 1b in the barrel 1 and through a similar slot 16b in the liner 16. The rod 15 normally occupies the position shown in FIG. 1 but can be moved axially to the right by pulling the trigger to compress the spring 10. The right hand end of the barrel is slotted at four diametrically opposite positions and splayed out to form four workpiece engaging prongs 20 which define elongate observation areas 19 between them.

The handle and trigger are preferably covered with thermal insulating material (not shown).

In use, two sheet metal workpieces 21, 22 to be welded together are arranged one behind the other as shown in FIG. 1. The back sheet 22 is supported by means 22a. The free ends of prongs 20 are urged against the face of sheet 21 to press the sheet 21 firmly against sheet 22 and the trigger 9 is depressed to move the rod 15 to the right against the bias of spring 10 so that it touches the sheet 21. Once the rod and workpiece make contact, electric current (preferably around 50 amps) immediately flows through the handle 2, trigger 9, wire 12 and collar 14, rod 15, the sheets 21, 22, the barrel 1 and rod 4. The trigger is then gently released so that the rod 15 lifts off the sheet 21. The latter movement causes an electric arc to be struck between the rod 15 and the sheet 21. The arc is maintained long enough to enable the heat generated to melt an area $W_1$ of sheet 21 and to melt at least an adjacent area $W_2$ of the sheet 22. The arc is then extinguished by releasing the trigger further to allow the rod to retract further from sheet 21 and the areas $W_1, W_2$ fuse together to form a weld. The process can be repeated at intervals along the sheet 21 to form a line of spot welds. The ability to view the molten pool of metal at the weld site through the elongate observation areas insures proper formation of the weld.

Instead of conducting electric current to the rod 15 through the handle and trigger, it is envisaged that the rod 4 may be suitably insulated from the barrel with its upper end electrically connected to the copper coated carbon rod 15 eg via a sliding contact. The rod 4 would then be connected to one terminal of the transformer 11 and the handle would be connected to the other terminal.

During use, the right hand end of the rod 15 tends to burn away and the rod shortens. The rod can, however, be moved to the right within the collar 14 by loosening the screw 17 to compensate for such wear.

To ensure that the screw 17 and leg 13 do not touch the barrel, the insulating sleeve 16 may include portions which also line the slots 1a, 1b of the sleeve.

The welder of the invention is ideal for welding together thin metal sheets of the type used in motor vehicle construction and is ideal for the home mechanic. It can be produced at low cost and can be used for spot welding steel, aluminium and other metals without the use of special fluxes. Moreover the application of the welder to one side only of workpieces to be joined is highly advantageous.

Various modifications may be made to the invention described without departing from the spirit and scope of the invention, which is defined by the appended claims.

What I claim as my invention and desire to secure by Letters Patent in the United States is:

1. A spot welder comprising support means for an elongate electrically conductive element, a holder for said element mounted on the support means for movement relative thereto whereby said element is movable towards and away from a workpiece to enable an electric arc to be formed between the element and the workpiece for welding the workpiece, an operating member for the holder, said operating member being mechanically attached to said holder and operable manually to control movement of the holder, a locking member on the holder for locking the element in the holder whereby said movement of the elements towards and away from the workpiece to weld the workpiece is controllable by manipulation of said operating member, a plurality of elongate workpiece engaging members extending longitudinally from the support means, said elongate members having free ends for engaging and applying pressure to the workpiece at spaced apart positions adjacent the region in which the arc is struck, and a plurality of elongate observation areas defined between the elongate workpiece engaging members, whereby the weld site can be viewed through said observation areas and the user can manually retract said element to extinguish the arc when he sees a pool of molten metal form at the weld site, thereby forming an effective weld.

2. A welder according to claim 1 in which the elongate workpiece engaging members are arranged to engage the workpiece at four positions around the region in which the arc is to be struck.

3. A welder according to claim 1 in which the locking means is a screw extending radially through the collar.

4. A welder according to claim 1 in which the support means is tubular and the holder for the element is movable axially of the tube, said elongate members being arranged at one end of the tube.

5. A welder according to claim 1 in which said holder comprises a collar, the collar being connected by means extending through the wall of the tubular support means to said operating member.

6. A welder according to claim 5 in which the operating member is in the form of a trigger.

7. A welder according to claim 6 in which the trigger is mounted on a handle connected to the tubular support means, movement of the trigger being transmitted to said means extending through the wall of the tubular support means by a link pivotally connected between the trigger and said member.

8. A welder according to claim 1 in which resilient means is provided to create a bias against movement of the element in one direction to said support means.

9. A welder according to claim 7 in which resilient means is provided to create a bias against movement of the element in one direction relative to the support means, the resilient element being arranged between the trigger and the handle.

10. A spot welder comprising a tubular support, a collar in the tubular support, a copper-coated carbon rod in the collar and extending generally coaxially of the tubular support, said collar being movable relative to the support whereby said copper-coated carbon rod is movable towards and away from a workpiece to enable an electric arc to be formed between the element and the workpiece for welding the workpiece, an operating member mechanically connected to said collar by means extending through the wall of the tubular support, said operating member being operable mannually to control movement of the collar and rod, a locking screw on the collar for locking the rod to the collar whereby said movement of the rod towards and away from the workpiece to weld the workpiece is controllable by manipulation of said operating member, a plurality of prongs extending from said one end of said tubular support, said prongs having free ends arranged to engage and apply pressure to the workpiece at spaced apart positions adjacent the area where the arc is to be struck and defining elongate observation spaces between them, and resilient means for providing a bias which acts against the movement of the collar in one direction axially of the tubular support, whereby the weld site can be viewed through said observation spaces and the user can manually retract said rod to extinguish the arc when he sees a pool of molten metal form at the weld site, thereby forming an effective weld.

* * * * *